United States Patent [19]

Debrotnic

[11] 4,131,438
[45] Dec. 26, 1978

[54] DEGASSER AND LIQUID SEAL RESERVOIR

[75] Inventor: John S. Debrotnic, Seattle, Wash.

[73] Assignee: The United States of America as represented by the Secretary of the Air Force, Washington, D.C.

[21] Appl. No.: 848,622

[22] Filed: Nov. 4, 1977

[51] Int. Cl.$^2$ .................................................. B01D 19/00
[52] U.S. Cl. ................................. 55/204; 55/459 R; 137/181; 210/512 R
[58] Field of Search ................. 55/36, 159, 182, 204, 55/205, 459 R; 137/181, 197, 587; 210/512; 220/85 VR, 85 VS, 86 R

[56] References Cited

U.S. PATENT DOCUMENTS

| | | | |
|---|---|---|---|
| 2,556,319 | 6/1951 | Davis | 55/204 X |
| 2,983,331 | 5/1961 | Helsley, Jr. | 55/204 |
| 3,044,206 | 7/1962 | Bearden et al. | 55/204 |
| 3,130,022 | 4/1964 | Clark | 55/204 X |
| 3,377,779 | 4/1968 | Kronk et al. | 55/204 |
| 3,397,512 | 8/1968 | Webb | 55/204 |
| 3,612,083 | 10/1971 | Kronk | 137/43 |
| 3,771,288 | 11/1973 | Wisman et al. | 55/204 |

Primary Examiner—Charles N. Hart
Assistant Examiner—Richard W. Burks
Attorney, Agent, or Firm—Joseph E. Rusz; James S. Shannon

[57] ABSTRACT

A unitized apparatus with no moving parts capable of degassing the liquid flowing through it, forming a liquid seal and reservoir between the pressurization system and flowing liquid, and operating in an aircraft type varying "G" environment. Two cylindrical tanks are vertically disposed one within the other with a transfer tube forming the means of communication between their interiors. Liquid within the inner tank covers one end of the transfer tube both to form a liquid seal and to function as a limited reservoir. Gas introduced into the upper region of the inner tank pressurizes the system. The flowing liquid to be degassed is introduced tangentially between the tanks and exists through an opening in the outer tank near its lower end, producing a rotational flow and a centrifugal force to drive the gas bubbles inward toward gas traps located on the surface of the inner tank. Vortex flow within the trough-like gas traps captures the gas bubbles and confines them in the traps while the bubbles rise. The gas bubbles eventually float upward past a baffle ring, located above the liquid inlet, to enter a region where the liquid turbulence is no longer adequate to draw them back into the flowing liquid beneath.

2 Claims, 2 Drawing Figures

DEGASSER AND LIQUID SEAL RESERVOIR

RIGHTS OF THE GOVERNMENT

The invention described herein may be manufactured and used by or for the Government of the United States for all governmental purposes without the payment of any royalty.

BACKGROUND OF THE INVENTION

This invention relates to an apparatus for removing gas bubbles from a flowing liquid in a sealed recirclating line, such as a radar cooling system, and simultaneously functioning as a liquid seal and reservoir capable of operating in an aircraft type varying "G" environment.

Conceptually, the use of centrifugal force to remove gas from a blowing liquid is not novel. Examples of the basic approach are presented in U.S. Pat. Nos. 2,811,219 and 3,826,064. Likewise, the use of a liquid level to form a seal has also been shown in the prior art, e.g., U.S. Pat. No. 2,751,926.

An experienced designer will immediately recognize that such basic approaches, though successful for their intended applications, exhibit numerous inherent deficiencies when the application is prescribed to be an aircraft. The degassing function must now continue irrespective of "G" conditions, i.e., in an aircraft negative or slide slip "G" environment. Likewise, the liquid seal system can no longer rely on a stationary liquid level, but must be capable of maintaining such a seal while the sealant liquid moves in consonance with the "G" forces. The problem of maintaining the liquid seal between the flowing liquid and the gas cavity is further exacerbated in most aircraft applications by the need for pressurization within the liquid system to minimize pump cavitation.

Foremost though, is the need for exceptional reliability. To compensate for minor leaks, the system should contain a reservoir of liquid, integral with the liquid seal to avoid hardware duplication. Incorporating such a reservoir in an unused region of the degassing structure is obviously beneficial. The dominant design goal for an apparatus performing such functions in an aircraft environment, and one historically bearing directly on reliability, is the minimization of moving parts. With no bellows, diaphrams, pistons, seals, etc. to deteriorate or fail the operational reliability is significantly enhanced.

BRIEF SUMMARY OF THE INVENTION

According to this invention an apparatus is disclosed that is capable of simultaneously performing the functions of a degasser, a liquid seal, a reservoir, an expansion tank and a pressurization means, without moving parts and with the ability to operate in an aircraft type varying "G" environment. The apparatus is in the form of two cylindrical tanks, one within the other, with their interiors connected through a transfer tube. The inner tank end of the tube extends into a reservoir of liquid partially filling the inner tank. The unused volume of the inner tank serves as an expansion chamber and an avenue through which pressurized gas may be introduced to pressurize the whole system. A tangential inlet opening between the tanks, and an outlet opening near the bottom of the outer tank, causes the liquid to rotate as it flows through, thereby driving the lower density gas bubbles inward. Trough-like gas traps on the inner tank catch the gas bubbles and allow them to rise above the baffle ring, a device located above the fluid inlet designed to confine the turbulent flow of the liquid to the region beneath it.

DETAILED DESCRIPTION OF THE INVENTION

Figure 1:
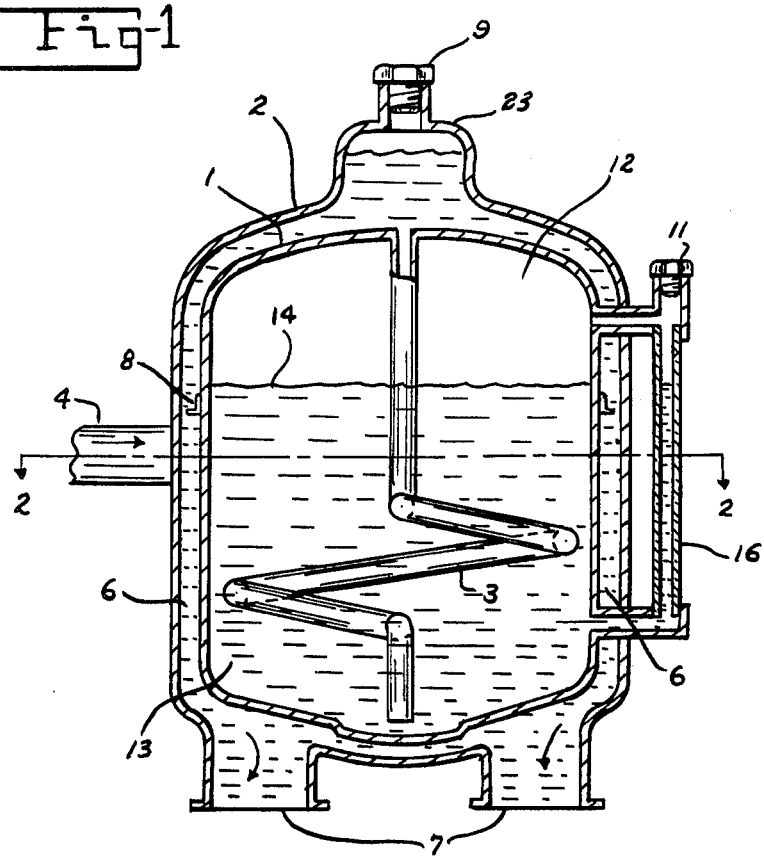
FIG. 1 shows a cross-sectional view of an embodiment taken vertically through its center.
Figure 2:
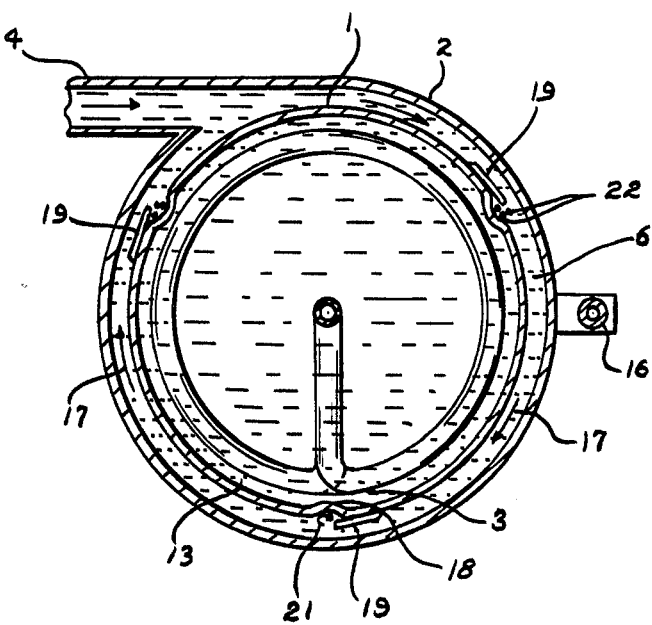
FIG. 2 is a sectional view of the same embodiment at location 2—2 as displayed in FIG. 1.

Shown in FIG. 1 is an apparatus embodying the invention disclosed herein, sectioned vertically through its center. The multiple tank structure, the transfer tube configuration, the relative levels of liquid and the entry and exit openings are all displayed. FIG. 2 is the same device when sectioned through 2—2 on FIG. 1. Here the rotational flow of the liquid and relative structure of the gas bubble traps are shown. In the forthcoming details describing the embodiment, reference numerals apply to either figure without distinction.

Cylindrically shaped inner tank 1 is mounted within coaxial cylindrical outer tank 2. Transfer tube 3 is secured to and extends through the center top of inner tank 1, thereby forming a means of communication between the inner and outer tank cavities. The loop at the lower end of the transfer tube has been incorporated to increase the volume of liquid within the tube.

The liquid to be degassed is moved by an external pumping means, entering the device through inlet opening 4, between the tanks, and exiting through two outlet openings 7 located in the bottom of the outer tank. Entry of the flowing liquid between the tanks and tangential to their cylindrical surfaces produces a significant rate of fluid rotation 17 in region 6 of the apparatus. By action of centrifugal force the lower density gas bubbles in the liquid are driven inward toward the outer surface of inner tank 1. Inner tank 1 contains three indentations 18 which are partially covered by circumferential extensions 19, forming therein cavities in the shape of vertical troughs. By nature of the rotational flow of the liquid between the tanks, a vortex 21 is produced in each of the troughs which proceeds to trap and entrain gas bubbles 22. The confined bubbles float upward in the trough, past baffle ring 8, and eventually gather under gas collection dome 23. Baffle ring 8 reduces the rotational flow rate of liquid above it, thereby serving as a barrier to prevent the gas bubbles above it from being drawn back down into the main liquid flow in region 6. Gas bleed valve 9 is used to manually bleed any gas that may be collected from the liquid system.

Incorporated into inner tank 1 is liquid reservoir 13, which when combined with the operation of transfer tube 3 and outer tank 2 acts as a liquid seal. Under normal "G" conditions, downward gravitational pull only, liquid 13 separates cavity 12, filled with gas, from the liquid flowing through the degasser apparatus. Expansion, contraction and minor liquid losses within the main flow are compensated for through transfer tube 3. Likewise, the overall liquid system can be maintained under pressure, e.g., to minimize pump cavitation, directly through pressurization port 11. The level 14 of the liquid inside the reservoir is easily determined through sight gage 16.

When the apparatus is subjected to an aircraft type negative or side slip "G" condition pressurization gas within cavity 12 moves toward the lower end of inner tank 1 while reservoir liquid 13 moves toward the top.

Nevertheless, the liquid seal separating the flowing liquid in region 6 from the pressurization gas is not lost, since transfer tube 3 remains full of liquid. Of course, the size and length of transfer tube 3 is selected to contain sufficient liquid to satisfy any transient demands for liquid occurring during the period of varying "G" forces.

While the invention is shown and described with reference to a particular embodiment, those skilled in the art will recognize that variations in form and material may be made without departing from the spirit or scope of the invention.

I claim:

1. An apparatus for separating gas bubbles from a flowing liquid, comprising:
   a. a vertically disposed inner cylinder,
   b. a coaxially oriented outer cylinder of a diameter slightly larger than the inner cylinder,
   c. a liquid inlet opening in the outer cylinder oriented to introduce the flowing liquid tangential to the outer cylinder in a substantially horizontal plane,
   d. a liquid outlet opening in the lower region of the outer cylinder,
   e. a baffle ring means, disposed horizontally between the two cylinders and above the liquid inlet opening, for limiting the flow rate of the liquid above said means to a rate incapable of drawing gas bubbles from above said means down into the liquid flowing below said means,
   f. at least one gas trap means, in the shape of a vertically oriented trough along the outer surface of the inner cylinder extending from a location below the liquid inlet opening to a location above the baffle ring means, for separating gas bubbles from the flowing liquid by vortex action within the trough and entraining the gas bubbles within the trough until they rise above the baffle ring means, and
   g. a gas venting means in the upper region of the outer cylinder and substantially above the baffle ring means.

2. An apparatus of a unified construction and having no moving parts for use in a line of flowing liquid, capable of both degassing and maintaining a pressurized liquid seal while subjected to an aircraft type negative "G" environment, comprising:
   a. a vertically disposed substantially cylindrical inner tank partially filled with liquid,
   b. a coaxially oriented outer tank of a diameter slightly larger than the inner tank,
   c. a liquid inlet opening in the outer tank oriented to introduce the flowing liquid tangential to the outer tank in a substantially horizontal plane,
   d. a liquid outlet opening in the lower region of the outer tank,
   e. a baffle ring means, disposed horizontally between the two tanks and above the liquid inlet opening, for limiting the flow rate of liquid above said means to a rate incapable of drawing gas bubbles from above said means down into the liquid flowing below said means,
   f. at least one gas trap means, in the shape of a vertically oriented trough along the outer surface of the inner tank extending from a location below the liquid inlet opening to a location above the baffle ring means, for separating gas bubbles from the flowing liquid by vortex action within the trough and entraining the gas bubbles within the trough until they rise above the baffle ring means,
   g. a gas collection and venting means, located in the upper region of the outer tank and above the baffle ring means, for confining and venting gas removed from the liquid,
   h. a downwardly extending conduit attached to the top of the inner tank and extending to a location below the level of the liquid within the inner tank, providing a path of communication between the liquid in the inner and outer tanks, and
   i. a pressurization means for the inner tank.

* * * * *